(12) United States Patent
Giazotto

(10) Patent No.: US 7,506,549 B2
(45) Date of Patent: *Mar. 24, 2009

(54) METHOD AND APPARATUS SUITABLE FOR MEASURING THE DISPLACEMENT OR LOAD ON AN AIRCRAFT COMPONENT

(75) Inventor: Alessandro Riccardo Britannico Giazotto, Bristol (GB)

(73) Assignee: Airbus UK Limited, Bristol (GB)

( * ) Notice: Subject to any disclaimer, the term of this patent is extended or adjusted under 35 U.S.C. 154(b) by 10 days.

This patent is subject to a terminal disclaimer.

(21) Appl. No.: 10/569,668

(22) PCT Filed: Aug. 26, 2004

(86) PCT No.: PCT/GB2004/003665

§ 371 (c)(1),
(2), (4) Date: Feb. 24, 2006

(87) PCT Pub. No.: WO2005/022101

PCT Pub. Date: Mar. 10, 2005

(65) Prior Publication Data

US 2006/0288796 A1    Dec. 28, 2006

(30) Foreign Application Priority Data

Aug. 27, 2003  (GB) ............................... 0320079.7

(51) Int. Cl.
*G01L 1/24* (2006.01)
(52) U.S. Cl. ........................................... 73/800
(58) Field of Classification Search ............ 73/800
See application file for complete search history.

(56) References Cited

U.S. PATENT DOCUMENTS 3,900,828 A    8/1975    Lage et al.

(Continued)

FOREIGN PATENT DOCUMENTS

DE        40 35 197 A1    1/1992

(Continued)

OTHER PUBLICATIONS

Blaha, et al., "Avionic Fiber Optic Sensor Systems," *Proc. 1st int. workshop on photonic networks, components and applicaitons*, (pp. 142-150) (1990).

*Primary Examiner*—Harshad Patel
*Assistant Examiner*—Octavia Davis
(74) *Attorney, Agent, or Firm*—Patterson, Thuente, Skaar & Christensen, P.A.

(57) ABSTRACT

The load on an aircraft component, such as the load on a landing gear leg during braking, is measured with a contactless, all-weather displacement measuring system. The system includes a control unit a controllable microwave emitter of electromagnetic radiation and a microwave detector comprising a plurality of antennae. When the aircraft component is subjected to a load relative movement of the emitter and detector is caused. The detector generates in response to microwave radiation received from the focused beam of radiation emitted by the emitter a signal that is received by a signal processor of the control unit. The signal received by the control unit depends on the relative positions of the emitter and detector. The control unit is arranged to provide an output signal representative of the load sustained by the aircraft component. The system may be used to control braking in dependence on the output signal so as to maximize braking efficiency without overloading the landing gear leg.

21 Claims, 4 Drawing Sheets

U.S. PATENT DOCUMENTS

| | | | |
|---|---|---|---|
| 4,129,872 A * | 12/1978 | Toman | 343/768 |
| 4,409,842 A | 10/1983 | Scott et al. | |
| 4,426,875 A | 1/1984 | Crosby, Jr. | |
| 4,480,480 A * | 11/1984 | Scott et al. | 73/769 |
| 4,684,929 A | 8/1987 | Edwards et al. | |
| 4,900,920 A | 2/1990 | Federmann et al. | |
| 4,962,669 A | 10/1990 | Gernhart et al. | |
| 5,044,205 A | 9/1991 | Wolff et al. | |
| 5,167,385 A | 12/1992 | Häfner | |
| 5,170,366 A * | 12/1992 | Passarelli | 702/41 |
| 5,381,005 A | 1/1995 | Chazelas et al. | |
| 5,397,891 A | 3/1995 | Udd et al. | |
| 5,606,137 A | 2/1997 | Penketh | |
| 5,633,467 A * | 5/1997 | Paulson | 73/800 |
| 5,646,401 A | 7/1997 | Udd | |
| 5,656,783 A | 8/1997 | Frisch et al. | |
| 5,942,750 A * | 8/1999 | Sannerhaugen et al. | 250/227.14 |
| 6,032,090 A * | 2/2000 | von Bose | 701/37 |
| 6,293,141 B1 * | 9/2001 | Nance | 73/178 T |
| 6,466,643 B1 * | 10/2002 | Bueno et al. | 378/58 |
| 6,566,648 B1 | 5/2003 | Froggatt | |
| 6,637,266 B1 * | 10/2003 | Froom | 73/583 |
| 6,817,246 B1 | 11/2004 | Rottner et al. | |
| 2007/0032919 A1 * | 2/2007 | Giazotto | 701/3 |

FOREIGN PATENT DOCUMENTS

| | | |
|---|---|---|
| DE | 42 40 600 C1 | 6/1994 |
| DE | 43 16 043 A1 | 11/1994 |
| DE | 43 16 044 A1 | 11/1994 |
| EP | 0 066 923 A2 | 12/1982 |
| FR | 2 520 870 | 8/1983 |
| FR | 2 578 974 | 9/1986 |
| FR | 2 828 278 | 2/2003 |
| WO | WO 81/03698 | 12/1981 |
| WO | WO 01/18487 A1 | 3/2001 |

* cited by examiner

METHOD AND APPARATUS SUITABLE FOR MEASURING THE DISPLACEMENT OR LOAD ON AN AIRCRAFT COMPONENT

BACKGROUND OF THE INVENTION

The present invention relates to an aircraft including an apparatus for measuring the load sustained by an aircraft component and to a method of measuring such a load. In particular, the present invention relates to an apparatus for determining the load sustained by an aircraft when braking and/or maneuvering the aircraft on the ground.

When an aircraft maneuvers on the ground (including, for example, immediately after touch down), the aircraft is subjected to various loads including vertical wheel to ground loads and horizontal drag loads including, for example, loads caused by friction between the tires of the wheels of the aircraft and the ground. The landing gear is subjected to significant horizontal loads on braking. The landing gear and other components of the aircraft have to be carefully designed in order for the aircraft to be able to withstand such loads, and other operational loads, but without unduly increasing the mass of the aircraft.

By using a load measuring device as part of a feedback braking system it is possible to limit, at least in part, the maximum load sustained by the airframe, landing gear, or a part thereof and/or to facilitate efficient braking of the wheels. It may also be advantageous to use load measuring devices during the testing and development of new aircraft.

It is known to use strain gauges as part of such load measuring devices. These, however, have disadvantages associated with them. For example, strain gauges may have to be bonded to the structure being monitored, may require specialist maintenance, may only be able to provide a local load measurement, may be easily damaged, may be susceptible to noise and/or may require temperature compensation.

SUMMARY OF THE INVENTION

It is an object of the present invention to provide a load measuring apparatus suitable for external use on an aircraft and which mitigates one or more of the disadvantages outlined above. Alternatively, or additionally, it is an object of the present invention to provide an improved apparatus capable of providing information from which an indication of the load sustained by an aircraft component can be ascertained.

The present invention provides an aircraft including apparatus for measuring a load on a component of the aircraft, the apparatus including a control unit, a controllable emitter of electromagnetic radiation, and a detector able to detect radiation from said emitter, wherein the apparatus is arranged so that, in use when the aircraft component is subjected to a load of the type to be measured, relative movement of the detector and the position of the radiation from the emitter in the region of the detector is caused, the detector in use generates in response to electromagnetic radiation received from the emitter a signal that is received by the control unit, the signal being dependent on the relative positions of the detector and the radiation from the emitter in the region of the detector, and the control unit is arranged to provide an output signal dependent on the load sustained by the aircraft component.

The loads sustained by the aircraft component can cause the component to bend and, normally to a lesser extent, twist with respect to the rest of the aircraft. Thus, by measuring such movements it is possible to ascertain an indication of the load sustained by the aircraft component.

One advantageous and preferable feature of the apparatus of an embodiment of the present invention is that there need be no electrical contact between the emitter and detector. Another preferable feature is that there need not be any separate mechanical linkage between the emitter and detector (other than for example the structure on which the emitter and detector are positioned). Also there need not be any wave guide means, for example fiber optic cables or the like, between the emitter and detector. Preferably, the apparatus is so arranged that, in use, the radiation from the emitter detected by the detector travels through a gaseous medium, for example the air that is naturally present, at least for the majority of the distance between the emitter and the detector, and preferably for the entire distance.

The loads/displacements measured by means of an embodiment of the present invention need not be local loads/displacements such as those measured by the strain gauges or the like, of the prior art.

It will be understood that it is within the scope of the present invention for the detected radiation received from the emitter to have traveled on a path that diverges from the notional straight line on which the detector and the emitter lie. For example, the detector of the apparatus of the invention may be arranged to receive reflected radiation from the emitter. In such a case, the detector and emitter could be placed adjacent to each other, for example. In such a case it will be understood that when the aircraft component is subjected to a load of the type to be measured, relative movement will occur between the detector and the position of the radiation from the emitter in the region of the detector, but that there may be no relative movement between the detector and the emitter.

Preferably the signal that is generated by the detector in response to electromagnetic radiation received from the emitter is dependent on the relative positions of the emitter and detector. Thus, in accordance with this preferred feature, an embodiment of the present invention provides an apparatus, for example of an aircraft, for measuring a load on an aircraft component, the apparatus including a control unit, a controllable emitter of electromagnetic radiation, and a detector able to detect radiation from said emitter, wherein the apparatus is arranged so that, when the aircraft component is subjected to a load of the type to be measured, relative movement of the emitter and detector is caused, the detector in use generates in response to electromagnetic radiation received from the emitter a signal that is received by the control unit, the signal being dependent on the relative positions of the emitter and detector, and the control unit is arranged to provide an output signal dependent on the load sustained by the aircraft component.

At least one of the emitter and detector may be fixed at a first position local to the aircraft component. At least one of the emitter and detector may be fixed at a second position remote from the first position and more preferably remote from the aircraft component. Preferably, one of the emitter and detector is fixed at the first position and the other of the emitter and detector is fixed at the second position. Preferably the detector and emitter are configured to be able to be mounted at any of a multiplicity of distances apart.

The detector preferably comprises a plurality of spaced apart antennae. Preferably the antennae in use generate in response to electromagnetic radiation received from said emitter a signal or signals that in use are received by the control unit, which signal or signals being dependent on the relative positions of the detector and the radiation from the emitter in the region of the detector. The antennae in use may generate in response to electromagnetic radiation received from said emitter a signal or signals that in use are received by the control unit, which signal or signals being dependent on the relative positions of the emitter and antennae. The apparatus may be so arranged that the signal generated by the detector, whether in dependence on the relative positions of the detector and the radiation from the emitter in the region of the detector or on the relative positions of the emitter and detector, depends on the relative levels of intensity of radiation received by the antennae. The antennae are each preferably arranged to generate a current in dependence on the amount of radiation received by the antenna.

The signal generated by the detector may itself comprise a plurality of separate signals. The signal generated by the detector may, for example, comprise a plurality of separate components, each component relating to the signal generated by each antenna. The control unit may for example perform a calculation involving values ascertained from the respective components. For example the control unit may receive two signals, convert the two signals into digital signals and then calculate the difference between the two respective digital signals. The difference so calculated may thus provide an indication of the amount of movement in a given direction of two of the antennae relative to the radiation from the emitter in the region of the antennae, or more preferably of two of the antennae relative to the emitter.

The signal generated by the detector may alternatively, or additionally, comprise one or more components, wherein each component is representative of a combination of the signals from two or more antennae. The signals from the antennae may for example be combined before they are received by the control unit. For example, the antennae may generate analogue signals and signals from two antennae may be combined in a comparator circuit, the output (a single signal) being sent to the control unit.

A calculation may be performed by the control unit in order to ascertain the relative movement, the calculation involving a comparison of the signal from one antenna with the signal from another antenna. The comparison may simply consist of ascertaining the arithmetic difference between the magnitudes of the signals.

The shape and intensity profile of the radiation emitted by the emitter and the shape and position of an antenna are preferably such that the intensity of radiation received by the antenna at a multiplicity of spaced apart positions along an axis perpendicular to the notional line linking the emitter and an antenna increases with each successive position along the axis. Preferably, the intensity of radiation received by the antenna at positions along a section of an axis perpendicular to the notional line linking the emitter and an antenna varies substantially monotonically.

The controllable emitter may emit a focused beam of electromagnetic radiation. In such a case, each antenna may produce a signal that is dependent on the area of each antenna within the beam of radiation. The beam of radiation is conveniently emitted substantially in one direction. It will be understood that the beam of radiation may change direction after being emitted from the emitter, for example by way of a reflection. The focused beam may be such that the intensity of radiation is substantially constant within a significant portion of the cross-section of the beam. Alternatively, or additionally, the intensity of radiation may vary depending on the position within the beam. The intensity of radiation may be at a peak in the middle of the beam and varies monotonically with distance from the middle. The beam may have an intensity profile that is symmetrical. The beam may have an intensity profile that in cross-section forms contours of equal intensity that are substantially circular in shape.

The apparatus may be so arranged that the signals from a pair of antennae are used to produce a signal representative of the position of the detector relative to the position of the radiation from the emitter in the region of the detector in a single given direction. The apparatus may be so arranged that the signals from a pair of antennae are used to produce a signal representative of the position of the detector relative to the emitter in a single given direction. The single given direction will generally be in a direction that is not perpendicular to the notional straight line connecting the two antennae, and is preferably parallel to the notional straight line.

Preferably the emitter is fixedly mounted in relation to a first location on the aircraft and each of the plurality of antennae is fixedly mounted in relation to a second location on the aircraft, wherein movement of the first and second locations relative to each other depends on the relative movement of the aircraft component. In such a case, the apparatus is preferably arranged so that movement of the plurality of antennae in a first direction relative to the emitter causes the intensity of radiation detected by one of two antennae to increase and causes the intensity of radiation detected by the other of the two antennae to decrease. Thus, the difference in the respective signals generated by the two antennae facilitates the provision of an indication of the amount of movement in the first direction of the two antennae relative to the emitter. In such a case, the control unit preferably effectively calculates an output signal representative of the relative movement of the first and second locations.

The apparatus may conveniently be so arranged that the control unit need never ascertain an absolute value of the relative movement of the detector, whether relative to the position of the radiation from the emitter in the region of the detector or relative to the emitter. The signal from the detector may for example be converted directly into a signal representative of a load without there being an intermediate step of converting the signal from the detector into a signal relating to the relative movement or separation in a given direction. The apparatus may be so arranged that only the change in relative positions of the detector and radiation from the emitter in the region of the detector may be ascertained from the signal from the detector that depends on the relative positions of the detector and the radiation from the emitter in the region of the detector. The apparatus may be so arranged that only the change in relative positions of the emitter and the detector may be ascertained from the signal from the detector that depends on the relative positions of the emitter and the detector.

The detector need only have one pair of antennae if the load to be measured is in one direction only. However, the detector may be able to measure loads in more than one direction. The detector may therefore include two or more pairs of antennae. For example, the plurality of antennae may comprise a first pair of antennae and a second pair of antennae, wherein, in use, the signals generated by the first pair are used to generate an output representative of the displacement of a part of the aircraft component in a first degree of freedom and the signals generated by the second pair are used to generate an output representative of the displacement of a part of the aircraft component in a second degree of freedom.

The notional line extending from the middle of one antennae of a pair to the other antennae of the pair may intersect the notional line extending from the middle of one antennae of another pair to the other antennae of that other pair. The notional lines may mutually bisect each other. The notional lines are preferably transverse to each other and may be perpendicular. The apparatus may for example comprise a detector having a pair of antennae in the form of a cross.

It will be appreciated that it would be possible for one antenna to form one half of each of two pairs of antennae, so that only three antennae need be supplied in order to provide the ability of the detector measuring loads in two dimensions.

The arrangement of the apparatus is preferably such that the notional straight line on which each pair of antennae lies is substantially transverse to the notional straight line on which the emitter and detector lie.

The antennae are preferably arranged such that each antenna is separated from each other antenna. The separation between a pair of antennae may be set in dependence on the wavelength of radiation emitted by the emitter and/or the resolution or measurement required. The antennae within a pair of antennae may be separated by a significant distance. Alternatively, pairs of antennae may be separated only by a relatively small distance so that the antennae in each pair may be considered as being adjacent to each other. The region between antennae may be filled wholly or partially by anti-vibration material or an anti-vibration device. The antennae may all be mounted on an anti-vibration device.

The antennae may be mounted in the region of a structure or material that is able to absorb a significant proportion of electromagnetic radiation of a frequency in the range of frequencies detectable by the antennae. Such a structure or material may reduce the effects of unwanted reflected or diffracted electromagnetic radiation originating from the emitter interfering with the operation of the apparatus.

The apparatus may be so arranged that in use the signal generated by the detector in response to electromagnetic radiation received from the emitter is representative of the position of the detector relative to the position of the radiation from the emitter in the region of the detector, the position having two degrees of freedom.

The apparatus may be so arranged that in use the signal generated by the detector in response to electromagnetic radiation received from the emitter is representative of a relative position of the emitter and detector, the position having at least two degrees of freedom.

The apparatus may include a pair of detectors. The pair of detectors may be arranged to enable a torque sustained by the component to be measured. Preferably, the pair of detectors facilitates the measurement of relative movement along two substantially parallel and spaced apart axes. Such a measurement provides information on relative translational movement in a direction parallel to the two axes and also on relative rotational movement about an axis perpendicular to the plane containing the two axes. Each of the pair of detectors may be able to measure the relative position of the detector and the radiation from the emitter in the region of the detector, or more preferably the relative position of the emitter and detector, the position having two degrees of freedom.

The apparatus may be arranged to provide an output that is representative of the load sustained by the component. The output is preferably calculated by a processor in the control unit. The processor may when calculating the output use data concerning the relationship between the relative movement of the component and the load sustained by the component. The data is preferably stored in electronic memory in or immediately accessible by the control unit. The data may be calculated in advance by means of mathematically modeling the loading of the component, for example making use of finite element analysis techniques. The data may be ascertained in advance by making calibration measurements in relation to the aircraft component (or a component substantially identical thereto). Both such mathematical modeling techniques and calibration measurements may be used in combination. For example, a multiplicity of calibration measurements may be made of the relative movement of the aircraft component in response to successive different known loads. The processor may perform interpolation calculations when calculating the output with the use of the data.

The control unit may be arranged to control the radiation emitted by the emitter. Alternatively, the control unit may simply be in the form of a processing unit that provides the output signal dependent on the load. For example, the processing unit need not perform any other control function. The control unit may be in the form of a signal processor and/or a micro-processor.

The emitter is preferably arranged to emit microwave radiation. The emitter is preferably arranged to emit electromagnetic radiation having a wavelength in the range of 1 mm to 300 mm (a frequency range of 1 to 300 GHz). The use of microwave radiation in the detector system of an embodiment of the present invention is advantageous for several reasons. Microwave radiation is not significantly affected by environmental conditions like humidity, and visibility (including refraction and reflection caused by moisture in the air) and therefore has significant advantages over the use of electromagnetic radiation at wavelengths in the visible light spectrum. The wavelength profile of the radiation emitted by the emitter is preferably chosen in consideration of the resolution required, the reliability of the emitter/detector system at the chosen wavelength, and/or the expected air/weather conditions. The dependence of resolution of the apparatus on wavelength may be such that an increase in the wavelength reduces the resolution attainable. A decrease in wavelength may increase the likelihood of water or other moisture in the air detrimentally affecting the transmission of radiation. The emitter is preferably arranged to emit a signal of sufficient power that a reliably measurably different level of signal is generated (for example a different amount of current flows in an antenna) by the detector in response to each of a multiplicity (for example, at least 20) of successive different relative positions between the detector and the position of the radiation from the emitter in the region of the detector, or more preferably between the emitter and the detector.

The present invention may have application in relation to assessing the load on any aircraft component, where loading of the component causes movement of the component. The invention is of particular benefit in the case where the aircraft component is at least part of a leg of an aircraft landing gear. Preferably, in such a case, one of the emitter and detector is fixed to the top part of the landing gear leg or to the airframe, whilst the other of the emitter and detector is fixed to a lower part of the leg (which moves by a greater amount, when the leg is loaded, than a higher part of the leg), for example the outer cylinder of a shock absorbing part of the leg. The emitter and detector are preferably arranged to measure a substantially horizontal component of the movement made by the aircraft leg under loading.

The aircraft component could be at least a part of a wing of an aircraft. For example, the load sustained by a portion of a wing could be assessed by measuring the movement of the tip of the wing.

The aircraft component could be in the form of a control surface, such as an aileron. The aircraft component could be in the form of a part of the fuselage. The aircraft component could be in the form of a horizontal and/or vertical lifting surface.

The aircraft may further include a load control system. The load control system is preferably arranged to monitor a measurement of the load sustained by the aircraft component, the measurement being ascertained from the output signal from the control unit of the load measuring apparatus. The load control system is preferably arranged to control a part of the aircraft in dependence on the measurements so monitored.

For example, the load control system may be arranged to control a part of the aircraft so as to reduce the loads sustained by the aircraft in the event that the load control system calculates that the load exceeds given criteria. The given criteria could simply be a preset threshold. The given criteria could alternatively or additionally be time dependent. The given criteria may be a threshold that varies in dependence on other parameters.

The load control system may be in the form of a braking control system. The aircraft component may in that case be a leg of an aircraft landing gear. The braking control system may be arranged to control the braking in dependence on the loads monitored by the braking control system. The braking control system may for example be arranged to be able to control the braking force applied to the wheels of the landing gear. The braking control system may be arranged so that in the event that the braking control system detects that the load sustained by the leg exceeds a given threshold value, the level of braking is reduced. The braking control system may be arranged so that the output signal generated by the control unit is received by the braking control system. The braking control system may be arranged to monitor the load sustained by the aircraft leg and to control the braking force applied in order that under normal operating conditions the load on the leg of the landing gear does not exceed a preset threshold. The preset threshold may for example correspond to the maximum load that the aircraft leg is designed to withstand during normal operation.

The load control system and the control unit of the apparatus for measuring the load are preferably in the form of physically separate systems. However, it would be possible for the load control system and the control unit to be part of a single control system. For example, a computer processor could perform the functions of both the load control system and the control unit of the load measuring apparatus.

The present invention also provides an apparatus including a detector, an emitter and a control unit, the apparatus being configured to be suitable for use as the apparatus of the aircraft in accordance with any of the aspects of the present invention.

The present invention also provides a method of measuring a load on an aircraft component, the method including the following steps: causing electromagnetic radiation to be emitted from an emitter, measuring the radiation received by a detector from the emitter, the radiation measurement being dependent on the relative movement of the detector and the position of the radiation from the emitter in the region of the detector caused by a load on the aircraft component, and calculating an indication of the load sustained by the aircraft component from the radiation measurement together with data concerning the relationship between the radiation measurement and the load sustained by the component. Preferably the radiation measurement is dependent on the relative movement of the emitter and detector. The step of calculating an indication of the load may be performed as a single operation using the signals from the results of measuring the radiation by the detector. The method may include a separate step of calculating from the radiation measurement an indication of the relative movement of the emitter and detector. Such calculation may involve the use of data concerning the relationship between the radiation measurement and the relative movement of the emitter and detector. The indication of the relative movement may relate directly to the relative movement and/or position of a part of the aircraft component. In such a case the step of calculating an indication of the load sustained by the aircraft component may be performed by calculating the load from the calculated indications of the relative movement together with data concerning the relationship between the relative movement of the component and the load sustained by the component. The indication of the relative movement of the emitter and detector and the indication of the load may each be in the form of a numerical value. The numerical value(s) may be represented by digital or analogue electronic signals. The data used in the method may be calculated and/or determined by calibration measurements in advance and for example stored in a memory unit.

The apparatus of the invention may be used in the method of the invention. Thus, features described with reference to the apparatus of the invention may be incorporated into the method of the invention. Also, features described with reference to the method of the invention may be incorporated into the apparatus of the invention. For example, features already described with reference to the apparatus of the invention are described below with reference to their application in the method of the invention.

The detector used in the method preferably comprises a plurality of antennae. An indication of relative movement of the detector and the position of the radiation from the emitter in the region of the detector may thus be calculated from measurements of the relative amounts of radiation received by the antennae. An indication of relative movement of the detector and the emitter may be calculated from measurements of the relative amounts of radiation received by the antennae. The antennae may include a pair of antennae and the method preferably performs a calculation, for example to calculate an indication of the relative movement of the detector and the emitter, using the difference between the signals from the pair.

The indication of the relative movement of the detector and the position of the radiation from the emitter in the region of the detector may comprise an indication of movement in at least two dimensions or degrees of freedom. The indication of the relative movement of the emitter and the detector may comprise an indication of movement in at least two dimensions or degrees of freedom. The indication of the load sustained by the aircraft component may comprise an indication of the load in at least two dimensions or degrees of freedom.

The present invention also provides a method of controlling the loads sustained by an aircraft component. The method according to this aspect of the invention may include monitoring the loads sustained by the aircraft component by using the apparatus for measuring loads in accordance with any of the aspects of the present invention or by performing the method of measuring a load in accordance with any of the aspects of the present invention. The method according to this aspect of the invention may include a step of controlling a part of the aircraft in dependence on the results of the monitoring of the loads. The method according to this aspect of the invention may be performed when braking and/or maneuvering the aircraft on the ground. The method may for example be performed when maneuvering and braking the aircraft on the ground immediately after touch down when landing the aircraft. The aircraft may be braked by means of the application of one or more wheel brakes. Accordingly, the present invention also further provides a method of maneuvering an aircraft on the ground, the method including a step of controlling the aircraft according to the above-described method, wherein the loads on the leg of a landing gear of the aircraft are monitored and the steering and/or braking of the aircraft is controlled in dependence on the loads monitored.

The present invention may have application in relation to the measuring of loads on components, objects, or the like other than aircraft components. For example, loads on buildings or other structures such as bridges could be measured by means of the present invention. Thus the invention more generally provides an apparatus for measuring loads and a method of measuring loads as set out above except that the object of the measurements need not necessarily be in the form of an aircraft component. Also, the present invention may have a wider application in relation to the measuring of relative movement between two points (or two locations). For example, the aerodynamic shape of the wing of an aircraft, or part thereof, could be measured and/or monitored by means of the present invention. The aspect of the present invention relating to the measurement of the relative positions of two locations (and not necessarily calculating an indication of a load therefrom) may of course have application in relation to any component, object, or the like (i.e. not necessarily on an aircraft). For example, there may be provided in accordance with a more general aspect of the present invention an apparatus for measuring the relative movement of a first location relative to a second location, the apparatus including a control unit, a controllable emitter of electromagnetic radiation, and a plurality of antennae able to detect radiation from said emitter, wherein the emitter is fixedly mounted in relation to the first location, each of the plurality of antennae is fixedly mounted in relation to the second location, the apparatus is arranged so that movement of the plurality of antennae in a first direction relative to the emitter causes the intensity of radiation detected by one of two antennae to increase and causes the intensity of radiation detected by the other of the two antennae to decrease, so that the difference in the respective signals generated by the two antennae provides an indication of the amount of movement in the first direction of the two antennae relative to the emitter, and the control unit is arranged to receive a signal or signals from the plurality of antennae and to calculate therefrom an output signal representative of the relative movement of the first and second locations. The apparatus may but need not necessarily be arranged to measure the relative movement between two locations on an aircraft. The apparatus could for example be used to measure and/or monitor the change in shape of any object. Other features of the present invention as described herein may be incorporated, where appropriate, into this more general aspect of the invention. For example, the radiation is preferably in the form of a focused beam of microwave radiation.

DESCRIPTION OF THE DRAWINGS

Embodiments of the present invention will now be described by way of example with reference to the accompanying schematic drawings of which:

FIG. 2b is a sectional view of the detector shown in FIG. 2a;

DETAILED DESCRIPTION

Figure 1:
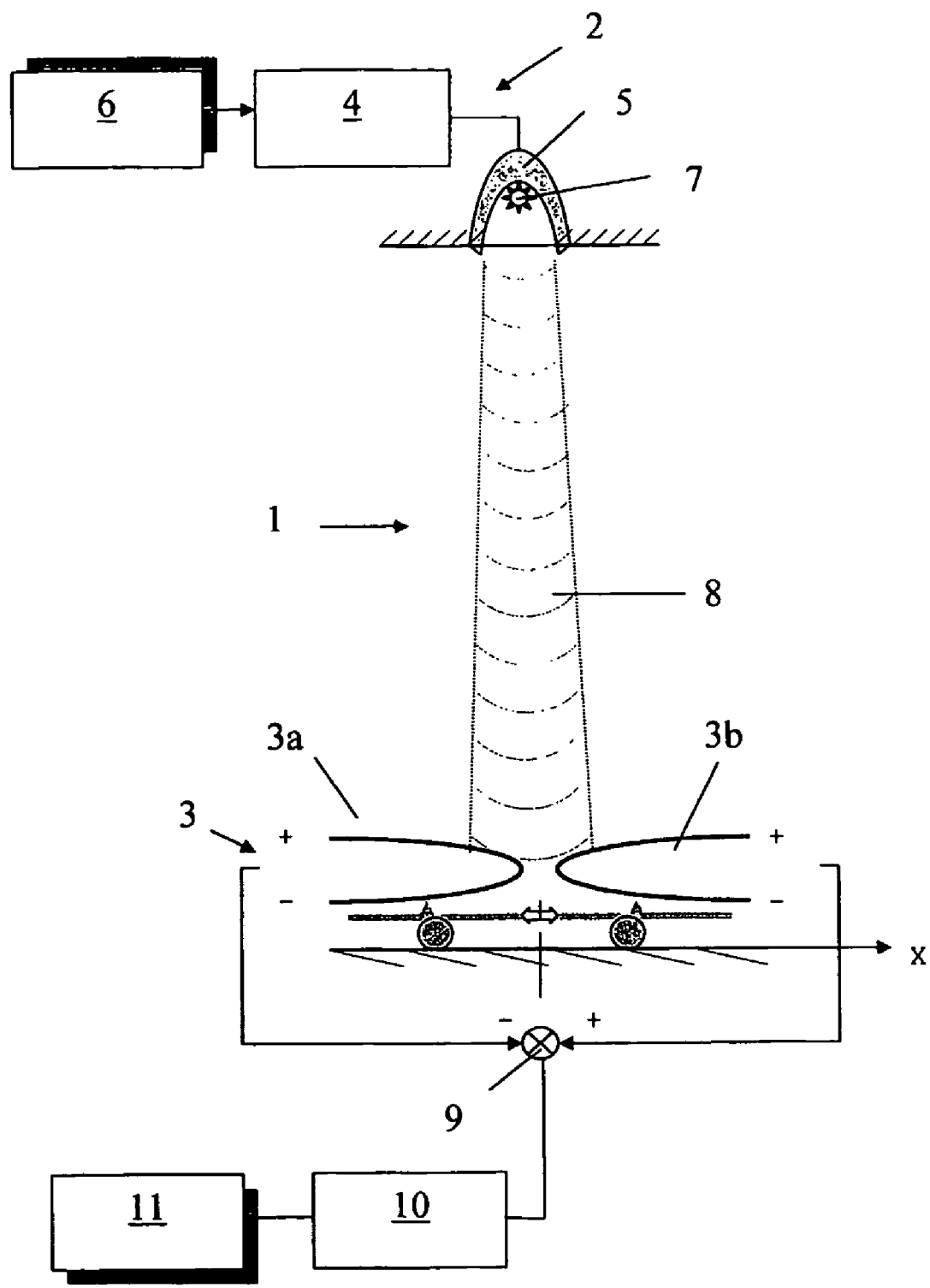
FIG. 1 shows a load measuring system including a microwave displacement measuring system according to a first embodiment of the invention.

FIG. 1 shows a contactless all-weather load measuring system 1 comprising a focused microwave emitter 2 fixed at one location and a pair of antennae 3a, 3b that form a microwave detector 3 (or double antenna receiver 3) fixed at another location. The load measuring system 1 is able to measure relative displacement between the emitter 2 and the double antenna receiver 3 along a given degree of freedom as is explained in further detail below. When the system 1 is arranged appropriately, the load sustained by an aircraft component can be calculated from the measure of relative displacement between the emitter 2 and the detector 3.

The focused emitter 2 comprises a power transmitter 4, a parabolic reflector 5 and a signal generator 6 that drives a microwave source 7 via the power transmitter 4. The signal generated by the generator 6 is in the form of a sinusoidal wave modulated in amplitude on the power transmitter carrier. The modulated signal fed to the microwave source 7 is used to characterize the radiation emitted by the emitter 2. The parabolic reflector 5 is used to produce a focused beam 8. The divergence of the beam 8 of radiation is influenced directly by the wavelength λ of radiation and inversely by the diameter of the parabolic reflector 5 and the divergence in turn affects the resolution of measurement attainable. The wavelength of the microwave radiation is about 30 mm (corresponding to a frequency of about 10 GHz). At this wavelength a reasonable resolution of measurement is possible with reasonable accuracy and reliability in most weather conditions.

The two antennae 3a, 3b are fixed in position relative to each other, but mounted such that there may be relative movement between the antennae at one location and the emitter at another location. In the case illustrated by FIG. 1, an equal intensity of radiation from the focused microwave beam 8 is received by each antenna 3a, 3b and an equal current is induced inside each antenna. If the area of an antenna 3a, 3b exposed to the beam 8 increases, the current induced in that antenna also increases. Thus, if for example the detector 3 moves to the right in FIG. 1, the antenna 3a on the left will, by having moved into the beam, be exposed to more of the beam (a greater area of the antenna 3a will be exposed to the beam 8), whereas the antenna 3b on the right will, by having moved away from the beam 8, be exposed to less of the beam 8. The antenna 3a on the left will generate more current and the antenna 3b on the right will generate less current.

The currents from the antennae 3a, 3b are combined in a difference circuit 9 that effectively subtracts the current from the antenna 3a on the left from the current from the antenna 3b on the right. When the double antenna receiver 3 is in "zero" position with respect to the beam 8 (and thus also with respect to the focused emitter 2) the current induced in each antenna 3a, 3b is the same, thus the resultant output signal from the difference circuit 9 is zero. The output from the difference circuit 9 increases when the detector is moved to the left (as shown in FIG. 1) relative to the emitter 2 and decreases when the detector moves to the right relative to the emitter 2. Thus, the output from the difference circuit 9 depends on the component of relative movement between the emitter 2 and detector 3 along a single axis (in this case the x-axis). The output can therefore be used to measure relative movement with a single degree of freedom.

An amplitude analyzer 10 receives the output from the difference circuit 9. The amplitude analyzer 10 is arranged to convert the output from the difference circuit 9 into an output that is representative of the component of relative displacement in the degree of freedom direction (in this case the x-axis). The form of the relationship between the output from the difference circuit 9 and the relative displacement is programmed during a calibration process.

The output from the amplitude analyzer 10 is received by a load evaluator 11, which relates the relative displacement calculated by the amplitude analyzer to a load on the basis of a load model.

It will be appreciated that the system shown in FIG. 1 is only able to measure relative displacement in one direction (the x-axis) and that therefore only limited information can be ascertained regarding the loading of a component. However, the principles of operation of the system illustrated in FIG. 1 can be extended to enable measurements to be made of displacements having two or more degrees of freedom.

Figure 2A:
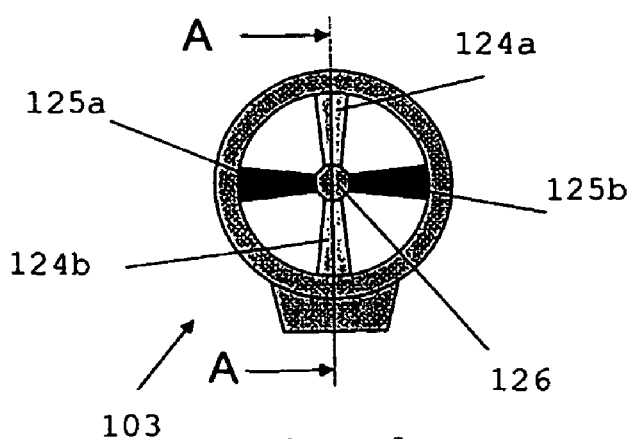
FIG. 2a is a plan view of a detector of a load measuring system according to a second embodiment of the invention.
Figure 2B:
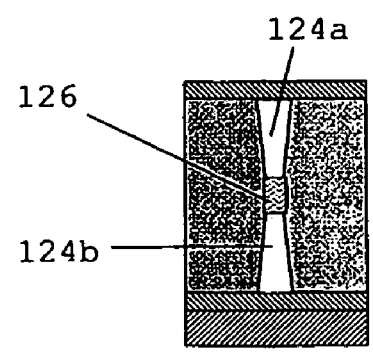
Figure 2E:
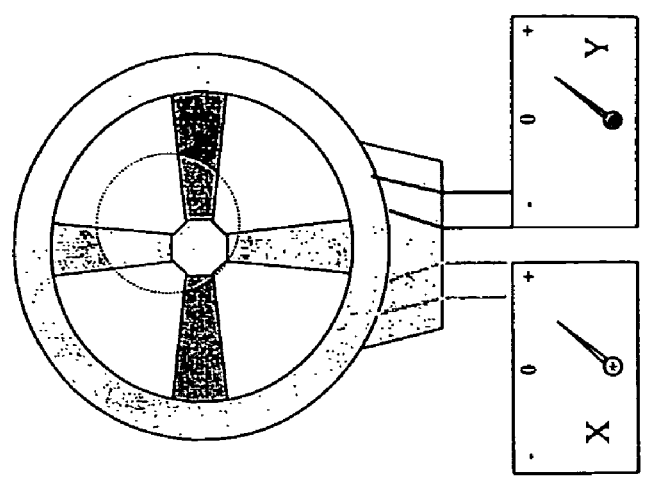
FIGS. 2c to 2e are plan views of the detector shown in FIG. 2a illustrating the way in which the detector works.
Figure 2D:
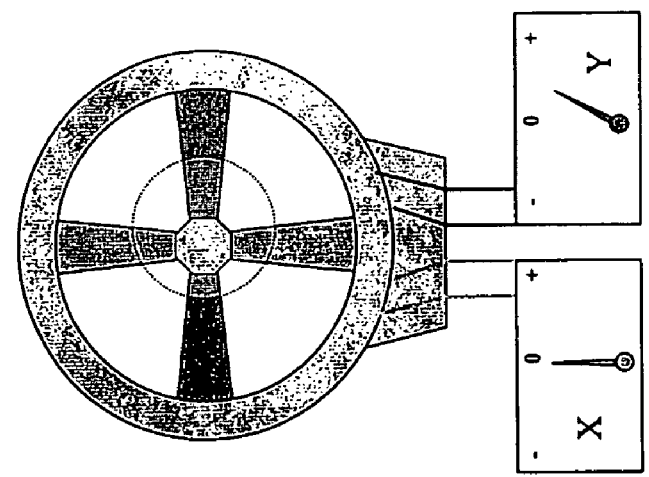
Figure 2C:
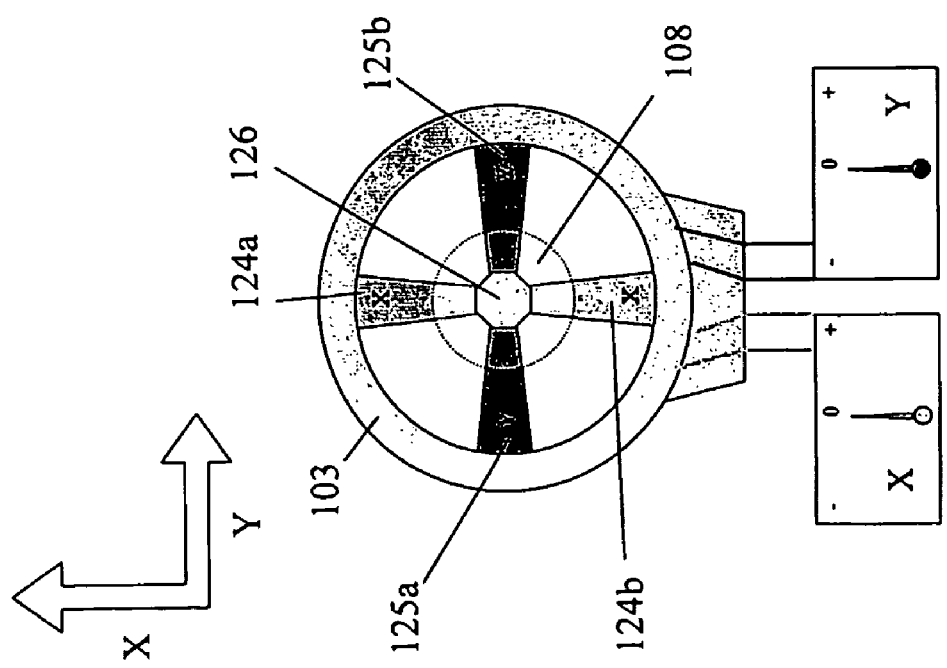

FIGS. 2a to 2e illustrate a detector 103 of load measuring system for measuring loads according to a second embodiment of the invention. The microwave detector 103 is arranged such that the system is able to detect movement in two dimensions. The detector 103 is shown in plan view in FIG. 2a. A cross-section taken along the plane A-A is shown in FIG. 2b. The detector 103 comprises two pairs of antennae 124a,b and 125a,b. The antennae of each pair are positioned opposite each other and have microwave detection surfaces that are positioned so that the beam of radiation 108 from the emitter (not shown) is generally transverse to the detection surfaces. The antennae 124, 125 are all joined by means of a stabilizer 126 that connects the tips of the antennae 124, 125 and reduces unwanted vibration of the antennae at the tips. The antennae form a cruciform arrangement, one pair 124a, 124b detecting relative movement along a first axis (for example, an x-axis, which is vertical in FIGS. 2a to 2e) the other 125a, 125b pair detecting relative movement along a second axis (for example, a y-axis, which is horizontal in FIGS. 2a and 2c to 2e) perpendicular to the first axis. The axes along which the antennae 124, 125 are able to detect movement are both substantially perpendicular to the beam 108 of radiation emitted by the emitter. FIGS. 2c to 2e illustrate how the two pairs of antennae 124, 125 are able to detect relative movement having two degrees of freedom (in this case relative movement having components in two dimensions). FIG. 2c shows the detector 103 in plan view, the detector comprising two x-axis antennae 124a and 124b and two y-axis antennae 125a and 125b. The difference between the current generated by one antennae of a pair and the other antenna of the pair is illustrated diagrammatically by means of the schematic needle gauges shown in FIGS. 2c to 2e. In FIG. 2c, the beam 108 of radiation, shown in cross-section, is positioned so that the centre of the beam is positioned over the mid-point between the four antennae 124, 125 and, as such, each antenna generates the same current, the difference in current of the antennae 124, 125 of either pair being zero. In FIG. 2d, the detector 103 has moved to the left so that relatively the beam has moved to the right of centre (along the y-axis). Thus, the right hand y-axis antenna 125b generates more current than the left-hand y-axis sensor 125a and the difference between the two currents increases, whilst the difference between the currents generated by the x-axis antenna 124a, 124b remains zero. In FIG. 2e, the beam 108 has moved above and to the right of centre (movement along both the x-axis and the y-axis). Thus, the right hand y-axis antenna 125b generates more current than the left-hand y-axis sensor 125a and the top x-axis antenna 124a generates more current than the bottom x-axis sensor 124b. The difference between the two x-axis currents increases, as does the difference between the y-axis currents.

The detector of FIGS. 2a to 2e is able to detect displacements of ±50 mm from the normal (central position) with a resolution of about 0.1 mm. It will of course be appreciated that the rest position need not necessarily be one in which the beam is centrally aligned with the antennae of the detector or one where the currents generated by all of the antennae are equal. There may of course be advantages in having an off-centre rest (or unloaded) position if the loading on the component is likely to be in one direction more than another.

Figure 3:
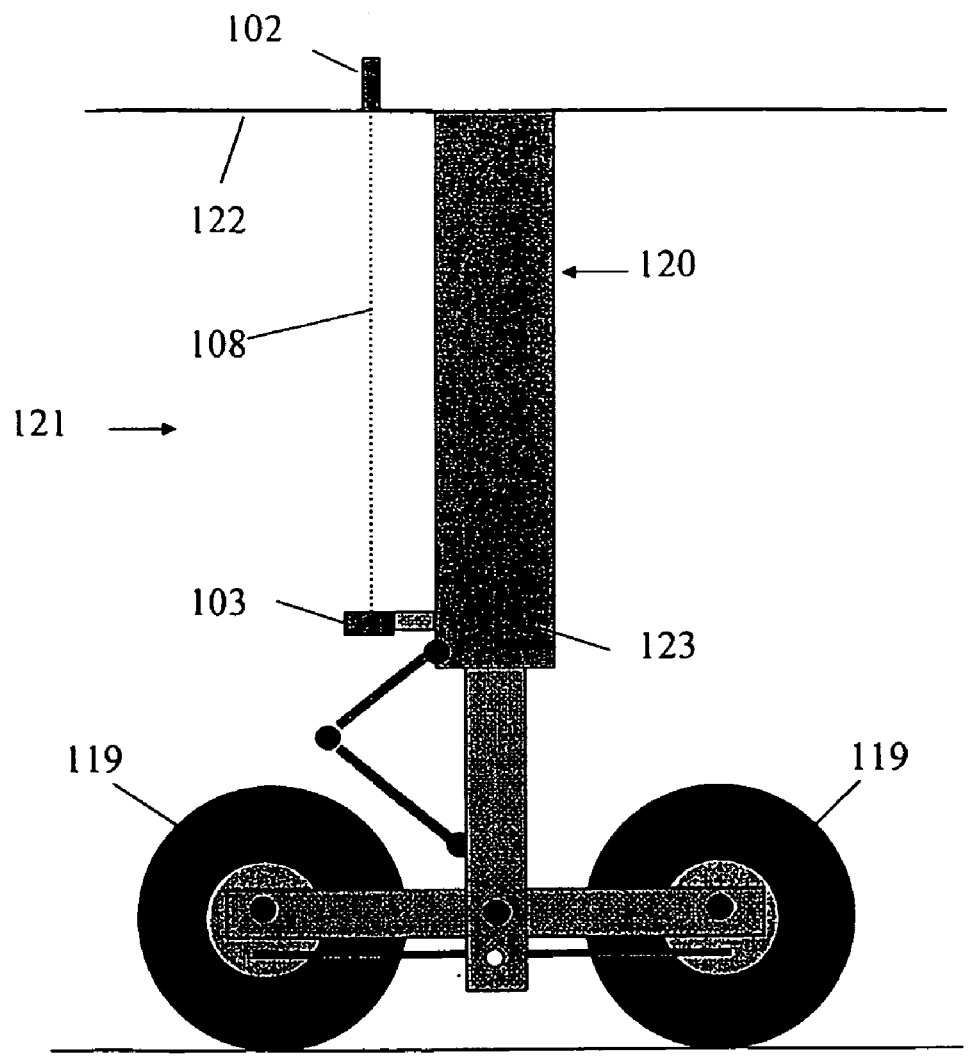
FIG. 3 is a side view of a landing gear having a load measuring system according to the second embodiment of the invention.

FIG. 3 illustrates a load measuring system for measuring the loads on a leg 120 of an aircraft landing gear 121 utilizing a detector 103 according to the second embodiment of the invention. The system comprises a microwave emitter 102 fixed to the airframe 122 of the aircraft and the microwave detector 103, which is fixed to the bottom of the outer cylinder 123 of the leg 120. When the wheels 119 of the landing gear are braked, after touchdown during landing for example, the resultant force on the landing gear 121 tends to bend the landing gear leg 120 about a horizontal axis that is perpendicular to the direction of movement of the aircraft. (In the description of the accompanying drawings the x-axis is taken to be the longitudinal axis of the aircraft, the y-axis is the other horizontal axis perpendicular to the x-axis and the z-axis is vertical.)

The outputs from each pair of antennae of the detector 103 are processed in much the same way as the processing of the signals in the one-degree-of-freedom embodiment described with reference to FIG. 1. The measurement of the load in this embodiment includes information concerning the load in both the x and y directions. The load is monitored continuously and if the load exceeds a preset threshold, the system causes the brake control system to reduce the braking force. This system of monitoring the loads and adjusting the braking accordingly is in the form of a feedback system.

Figure 4:
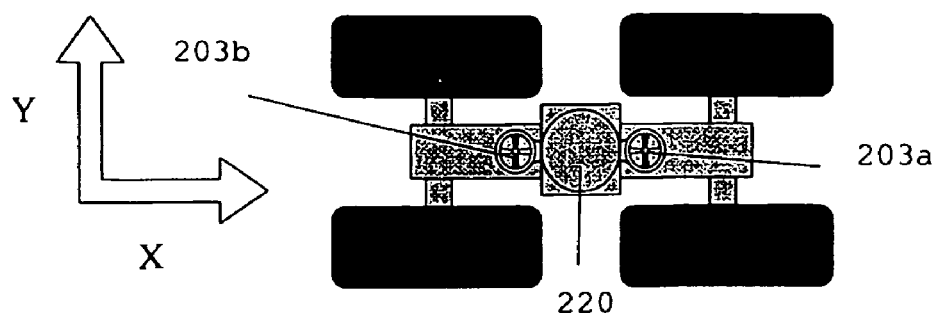
FIG. 4 is a plan view of a bogie and wheel set of a landing gear having a load measuring system according to a third embodiment of the invention.

FIG. 4 shows a third embodiment that is very similar to the above-described second embodiment, except that there are two detectors 203a,b each positioned at the bottom of the leg of the landing gear, one to either side of the leg 220. Two emitters (not shown) are also provided. The system is thus able to determine relative movement of two locations on the landing gear each in two dimensions. It is therefore possible to assess relative movement of each detector 203a,b and therefore to assess not only by how much the landing gear leg 220 is bending but also whether the leg 220 is twisting and, if so, by how much. The amount of twisting of the leg 220 can be determined by comparing the amount of movement of each detector 203 in the y-direction. Movement of significantly different amounts in the y-direction of the detectors 203 would suggest that the end of the leg 220 has rotated relative to the rest of the aircraft. The system is calibrated so that from given measurements of relative movement of the two detectors 203 it is possible to calculate bending loads on the leg 220 about the x-axis and the y-axis and also torsional loads on the leg 220 about its own axis (which is generally parallel to the z-axis).

Figure 5:
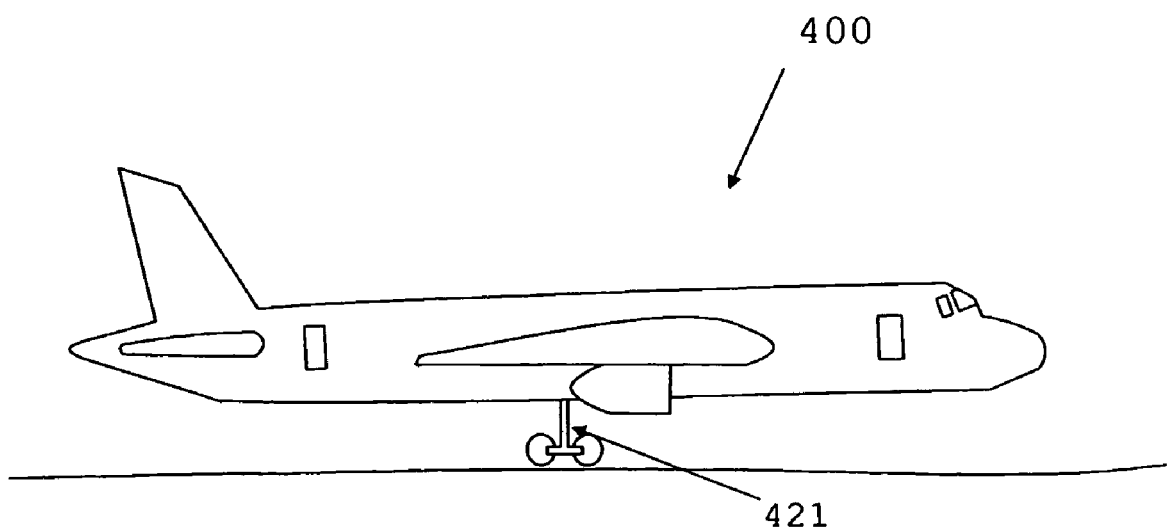
FIG. 5 shows an aircraft maneuvering on the ground, the maneuvering of the aircraft being effected in accordance with a fifth embodiment of the invention.

FIG. 5 shows an aircraft 400 landing on a runway in accordance with a fifth embodiment of the invention. The loads on the landing gear 421 of the aircraft 400 are monitored during landing by means of apparatus according to the embodiment described with reference to FIG. 3. After touchdown the brakes are applied and the loads on the landing gear 421 and on the braking system become significant. The braking of the aircraft 400 is controlled by a control system (not shown) that controls the braking in such a way as to reduce the likelihood of the loads on the landing gear 421 that are monitored becoming greater than preset thresholds. The use of microwave antennae in a system for load measuring as described above in relation to the drawings has many potential advantages over the known use of strain gauges. The microwave antennae are not bonded directly to the structure, and may therefore readily dismountable. The feature of the microwave measurement system being a wireless system also has significant advantages in relation to use of the system on an aircraft. Also the microwave systems of the presently described embodiments do not suffer from some of the problems associated with strain gauge based systems. The installation, use and maintenance of strain gauges require the skills of a specialist. Strain gauges enable only a local load measurement, which if located on a body having a complex shape may not reflect the real value of load. Some strain gauges use very thin and delicate electrical wires to transmit information regarding the deformation. Such thin wires can be easily damaged and generally operate at low electrical powers, and thus make the strain gauge susceptible to noise. The output of strain gauges is also often temperature sensitive.

The use of microwaves in particular has advantages, because in the microwave frequency range electromagnetic waves are less influenced by environmental conditions (such as humidity) than at other lower frequencies.

It will be appreciated that various modifications may be made to the above-described embodiments of the invention without departing from the spirit of the invention. It will for example be appreciated by those of ordinary skill in the art that the invention lends itself to many different variations not specifically illustrated herein. For example, it is possible either to have an arrangement in which the emitter is fixed on the aircraft and the receiver/detector (for example a double antenna receiver) is mounted to be movable (as in the embodiment described with reference to FIG. 3) with the aircraft component or to fix the receiver/detector to the aircraft body and let the emitter be movable. For example, the system could comprise a double antenna receiver (2 degree of freedoms) fixed to the airframe or to the top of landing gear outer cylinder and a focused emitter fixed to the lower part of the landing gear.

The embodiment described with reference to FIG. 1 includes steps of converting signals into values representative of relative movement and then converting the relative movement values into measurements of the load. Of course, such calculations and/or signal processing could be conducted as a single step, for example by a single computer processor. In such a case, calibration of the measuring system might be performed by relating the signals received from the antennae to a known load applied to a test rig comprising an identical landing gear to that of the aircraft on which the system is to be used.

Also, because the function of the amplitude analyzer of FIG. 1 can be implemented in software, the need for a zero current difference during installation of the system relating to the 'zero' (or rest) position is not necessary. Any unequal currents generated by the antennae when the relative position between the emitter and detector corresponds to the 'zero' position can be accounted for during calibration of the system.

In the embodiment described in FIG. 5, the control of the braking force applied could be controlled by means of a feedback loop, wherein when the measured load exceeds a pre-set threshold, the braking force is reduced. The amount by which the braking force is reduced could be a pre-set amount, or could be related to the amount by which the measured load exceeds the threshold. Other criteria could be used to assess how and when to reduce the braking force. For example, the braking force could be reduced as quickly as possible (possibly to zero) for a pre-set time, after which the braking force is reapplied.

Whilst FIGS. 2a to 2e show antennae having the same shape, it will be appreciated that not all the antennae need to have the same shape and that the shape of a given antennae may be different from that as shown in the Figures.

The apparatus could of course be adapted to measure the displacement of two spaced apart points on objects other than aircraft legs. The apparatus could be used for example to measure and monitor the change in shape of an aircraft wing in flight. The apparatus could alternatively be used to monitor the loading and movement of other load bearing structures such as for example a bridge. The emitter and antennae would of course need to be modified to be suitable for such applications so that appropriate ranges of measurement at appropriate resolutions could be made. Such modifications would mainly consist simply of scaling the size of the components up or down as appropriate and would require only routine work to be conducted by the notional person skilled in the art.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not delimit the scope of the independent claims.

The invention claimed is:

1. An aircraft including apparatus for measuring a current load on a component of the aircraft, the apparatus including a control unit, a controllable emitter of microwave radiation, and a detector able to detect radiation from said emitter, wherein the apparatus is arranged so that, in use when the aircraft component is subjected to a current load of the type to be measured, relative movement of the detector and the position of the radiation from the emitter in the region of the detector is caused, the detector in use generates in response to microwave radiation received from the emitter a signal that is received by the control unit, the signal being dependent on the relative positions of the detector and the radiation from the emitter in the region of the detector, and the control unit is arranged to provide an output signal dependent on the current load sustained by the aircraft component.

2. An aircraft according to claim 1, wherein the signal that is generated by the detector in response to radiation received from the emitter is dependent on the relative positions of the emitter and detector.

3. An aircraft according to claim 1, wherein one of the emitter and detector is fixed at a first position local to the aircraft component, and the other of the emitter and detector is fixed at a second position remote from the aircraft component.

4. An aircraft according to claim 1, wherein the detector comprises a plurality of spaced apart antennae, which in use generate in response to microwave radiation received from said emitter a signal or signals that in use are received by the control unit, which signal or signals being dependent on the relative positions of the detector and the radiation from the emitter in the region of the detector.

5. An aircraft according to claim 1, wherein the apparatus is so arranged that the signal generated by the detector in dependence on the relative positions of the detector and the radiation from the emitter in the region of the detector depends on the relative levels of intensity of radiation received by the antennae.

6. An aircraft according to claim 1, wherein the controllable emitter emits a focused beam of microwave radiation and each antenna produces a signal that is dependent on the area of each antenna within the beam of radiation.

7. An aircraft according to claim 1, wherein the apparatus is so arranged that the signals from a pair of antennae are used to produce a signal representative of the position of the detector relative to the position of the radiation from the emitter in the region of the detector, in a single given direction.

8. An aircraft according to claim 1, wherein the signal generated by the detector in use in response to microwave radiation received from the emitter is representative of the position of the detector relative to the position of the radiation from the emitter in the region of the detector having two degrees of freedom.

9. An aircraft according to claim 1, wherein the apparatus includes a pair of detectors arranged to enable a torque sustained by the component to be measured.

10. An aircraft according to claim 1, wherein the apparatus is arranged to provide an output that is representative of the load sustained by the component.

11. An aircraft according to claim 1, wherein the aircraft component is a leg of an aircraft landing gear.

12. An aircraft according to claim 11 and further including a load control system, wherein the load control system is arranged to monitor a measurement of the load sustained by the aircraft component, the measurement being ascertained from the output signal from the control unit, and to control a part of the aircraft in dependence on the measurements so monitored.

13. An aircraft according to claim 12, wherein the load control system is a braking control system, and the aircraft component is a leg of an aircraft landing gear, wherein the braking control system is arranged to control the braking in dependence on the loads monitored by the braking control system.

14. An apparatus for measuring a load on a component of an aircraft, the apparatus including a control unit, a controllable emitter of microwave radiation, and a detector able to detect radiation from said emitter, the apparatus being configured to be suitable for use as the apparatus of the aircraft as claimed in claim 1.

15. A method of measuring a load on an aircraft component, the method including the following steps: causing microwave radiation to be emitted from an emitter, measuring the radiation received by a detector from the emitter, the radiation measurement being dependent on the relative movement of the detector and the position of the radiation from the emitter in the region of the detector caused by a load on the aircraft component, and calculating an indication of the load sustained by the aircraft component from the radiation measurement together with data concerning the relationship between the radiation measurement and the load sustained by the component.

16. A method according to claim 15, wherein the radiation measurement is dependent on the relative movement of the emitter and detector.

17. A method according to claim 15, wherein the detector comprises a plurality of antennae and an indication of relative movement of the detector and the position of the radiation from the emitter in the region of the detector is calculated from measurements of the relative amounts of radiation received by the antennae.

18. A method according to claim 15, wherein the indication of the relative movement of the detector and the position of the radiation from the emitter in the region of the detector, comprises an indication of movement in at least two dimensions and the indication of the load sustained by the aircraft component comprises an indication of the load in at least two dimensions.

19. A method according to claim 15, when performed as part of a method of controlling the loads sustained by an aircraft component including monitoring the loads sustained by the aircraft component, the method further including a step of controlling a part of the aircraft in dependence on the results of the monitoring of the loads.

20. A method according to claim 19, when performed as part of a method of maneuvering an aircraft on the ground, the method further including a step of controlling the loads sustained by the aircraft during the maneuvers by means of monitoring the loads on the leg of the landing gear of the aircraft and controlling the braking and/or steering of the aircraft in dependence on the loads so monitored.

21. A method according to claim 15 wherein the step of measuring a load on an aircraft component includes performing a real-time calculation so as to provide a measurement on a current load.

* * * * *